United States Patent [19]

Henning et al.

[11] Patent Number: 4,729,724

[45] Date of Patent: Mar. 8, 1988

[54] BLOWER FOR PROPELLING A CONTINUOUS GAS STREAM WITH INFLATABLE GAS SEALS

[75] Inventors: Hans-Heinrich Henning, Ennepetal; Hartmut Lelickens, Wiesenthau; Herbert Schramm, Höchstadt, all of Fed. Rep. of Germany

[73] Assignee: Kraftwerk Union Aktiengesellschaft, Mülheim, Fed. Rep. of Germany

[21] Appl. No.: 913,500

[22] Filed: Sep. 29, 1986

[30] Foreign Application Priority Data

Sep. 30, 1985 [DE] Fed. Rep. of Germany ....... 3534903

[51] Int. Cl.$^4$ .................... F04B 17/00; F04B 35/04
[52] U.S. Cl. ................... 417/423 R; 415/113; 415/175; 277/34; 310/89
[58] Field of Search ............. 417/423 M, 423 P, 365, 417/368; 415/112, 113, 170 A, 171, 173 R, 174, 175, 176; 310/89; 277/34, 34.3

[56] References Cited

U.S. PATENT DOCUMENTS

| 1,999,163 | 4/1935 | Allen | 415/175 X |
|---|---|---|---|
| 2,736,265 | 2/1956 | Higgins | 415/171 |
| 3,137,237 | 6/1964 | Zager et al. | 417/423 M |
| 3,302,865 | 2/1967 | Kun | 417/423 P X |
| 3,544,116 | 12/1970 | Peterson | 415/112 X |
| 3,746,472 | 7/1973 | Rupp | 415/175 X |
| 3,873,864 | 3/1975 | Apostoleris | 310/89 |
| 4,168,936 | 9/1979 | Scheller et al. | 415/170 A |
| 4,317,087 | 2/1982 | Sander et al. | 372/57 |

FOREIGN PATENT DOCUMENTS 1097614 1/1961 Fed. Rep. of Germany .
1178519 5/1959 France .

OTHER PUBLICATIONS

IEEE Journal of Quantum Electronics, vol. 15, No. 9, Sep. 1979, p. 57d, New York, U.S.; J. L. Miller: "High--Purity Closed-Cycle Flow Rose-Gas Malide Laser". Patents Abstracts of Japan, vol. 7, No. 88, (E-170) [1233], Apr. 12, 1983; & JP-A-58 14589, (Hitachi Seisakusho).

*Primary Examiner*—Carlton R. Croyle
*Assistant Examiner*—Eugene L. Szczecina, Jr.
*Attorney, Agent, or Firm*—Herbert L. Lerner; Laurence A. Greenberg

[57] ABSTRACT

An apparatus for propelling a continuous gas mixture stream of an inert carrier gas and an aggressive doping gas, includes an electric motor having a motor housing filled with pure carrier gas and a shaft with a shaft extension, a radial blower having an impeller mounted directly on the shaft extension and a blower housing filled with the gas mixture and coupled to the motor housing, a gas ring of pure carrier gas being continuously fed and maintained in a ring space for sealing the blower housing against the motor housing in an operating state, and a hollow sealing ring being inflated with compressed gas for sealing the blower housing from the motor housing when the blower is stopped.

6 Claims, 3 Drawing Figures

BLOWER FOR PROPELLING A CONTINUOUS GAS STREAM WITH INFLATABLE GAS SEALS

The invention relates to a blower for propelling a continuous gas stream of a mixture of an inert carrier gas and an aggressive doping gas.

In order to operate a gas laser at a gas pressure of about 5 bar and a pressure difference of 0.25 bar between the suction and pressure side of the blower, it is necessary to transport gas volumes up to 100 dm$^3$/sec. heretofore this has been conventionally done with rotary piston pumps. However, these types of pumps are relatively costly, have a tendency to jam and may cause oil contaminations. Furthermore, rotary piston pumps are not very efficient as compared to other pumps and they heat the medium in an undesirable manner due to their power losses. A further disadvantage of rotary piston pumps is the oscillating or pulsing delivery, which necessitates costly measures to make the flow more uniform.

Tangential blowers are also used for CO$_2$ lasers, but such blowers provide neither the required output for a gas laser which is operated by a mixture of a carrier gas and a doping gas, nor a guarantee of reliable operation for continuous use if chemically aggressive doping gases are used, nor the necessary safety for the operating personnel.

It is accordingly an object of the invention to provide a blower for the continuous compression and movement of highly purified gases, which overcomes the hereinafore-mentioned disadvantages of the heretofore-known devices of this general type, which guarantees economical operation, which neither contaminates the gases which are to be transported, nor heats these gases to any degree worth mentioning and which permits a compact construction in combination with its drive motor.

With the foregoing and other objects in view there is provided, in accordance with the invention, an apparatus for propelling a continuous gas mixture stream of an inert carrier gas and an aggressive doping gas, comprising an electric motor having a motor housing filled with pure carrier gas and a shaft with a shaft extension, a radial blower having an impeller mounted directly on the shaft extension and a blower housing filled with the gas mixture and coupled to the motor housing, a ring space, a hollow sealing ring, means for continuously feeding and maintaining a gas ring of pure carrier gas in the ring space for sealing the blower housing against the motor housing in an operating state, and means for inflating the hollow sealing ring with compressed gas for sealing the blower housing from the motor housing when the blower is stopped.

In accordance with another feature of the invention, there is provided an intermediate storage device and a pressure equalizing line between the motor housing and the blower housing equalizing physically caused volume changes in the filling of the motor housing, independent of the operating state.

In accordance with a further feature of the invention, there is provided, a discharge valve, means for opening the discharge valve for reducing a pressure rise above a permissible level, and means for feeding carrier gas into the motor housing from the sealing gas ring upon the occurence of a pressure drop, for equalizing physically caused volume changes of the filling of the motor housing, independent of the operating state.

In accordance with an added feature of the invention, the ring space including the gas ring of pure carrier gas is disposed radially between the shaft extension carrying the impeller and the blower housing, and including two radially operating mechanical shaft seals axially adjacent the ring space.

In accordance with an additional feature of the invention, the impeller has a flange facing the motor and the blower housing has a wall facing the motor having an inner surface, the hollow sealing ring being formed of a soft material anchored at the inner surface of the wall of the blower housing, and the hollow sealing ring having a plurality of sealing lips lying against the flange of the impeller in the inflated state.

In accordance with yet another feature of the invention, there is provided a gas-tight membrane closing off the intermediate storage device and the pressure equalizing line from the blower housing.

In accordance with yet an added feature of the invention, the motor housing has surfaces therein, and including a non-gassing coating of a synthetic resin covering all of the surfaces.

In accordance with yet an additional feature of the invention, the electric motor has a rotor and a stator, and including a block or respective blocks of synthetic resin in which the rotor and the stator are embedded.

In accordance with still another feature of the invention, there is provided a gas or excimer laser with a discharge path through which the gas mixture flows.

In accordance with still a further feature of the invention, the carrier gas is a pure noble gas, such as neon, xenon or Krypton, and the doping gas is a halogen, such as chlorine or fluorine. In accordance with still an added feature of the invention, the blower housing and the motor housing have an operating pressure of 5 bar, and the blower has suction and pressure sides with a pressure difference therebetween of substantially 0.25 bar (250 mbar) at a conveying capacity of 70 l/s and a nominal speed of 11000 rpm. This provides an especially reliable operation over long operating periods.

In accordance with a concomitant feature of the invention, the electric motor includes a rotor carried by the shaft along with the impeller, and including compressed gas bearings supporting the shaft, and a compressed gas supply for the bearings being parallel and simultaneously to the gas supply into the ring space by the feeding means.

The blower according to the invention is especially advantageous because it makes it possible to produce a continuously flowing gas stream without further measures, having a high efficiency, a compact configuration, and a reliable protection of the interior of the drive motor from the aggressive doping gas, due to the practically contactless but still reliable seal provided by a gas ring during operation and by the inflatable hollow sealing ring when the blower is not in operation.

Other features which are considered as characteristic for the invention are set forth in the appended claims.

Although the invention is illustrated and described herein as embodied in blower for propelling a continuous gas stream, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
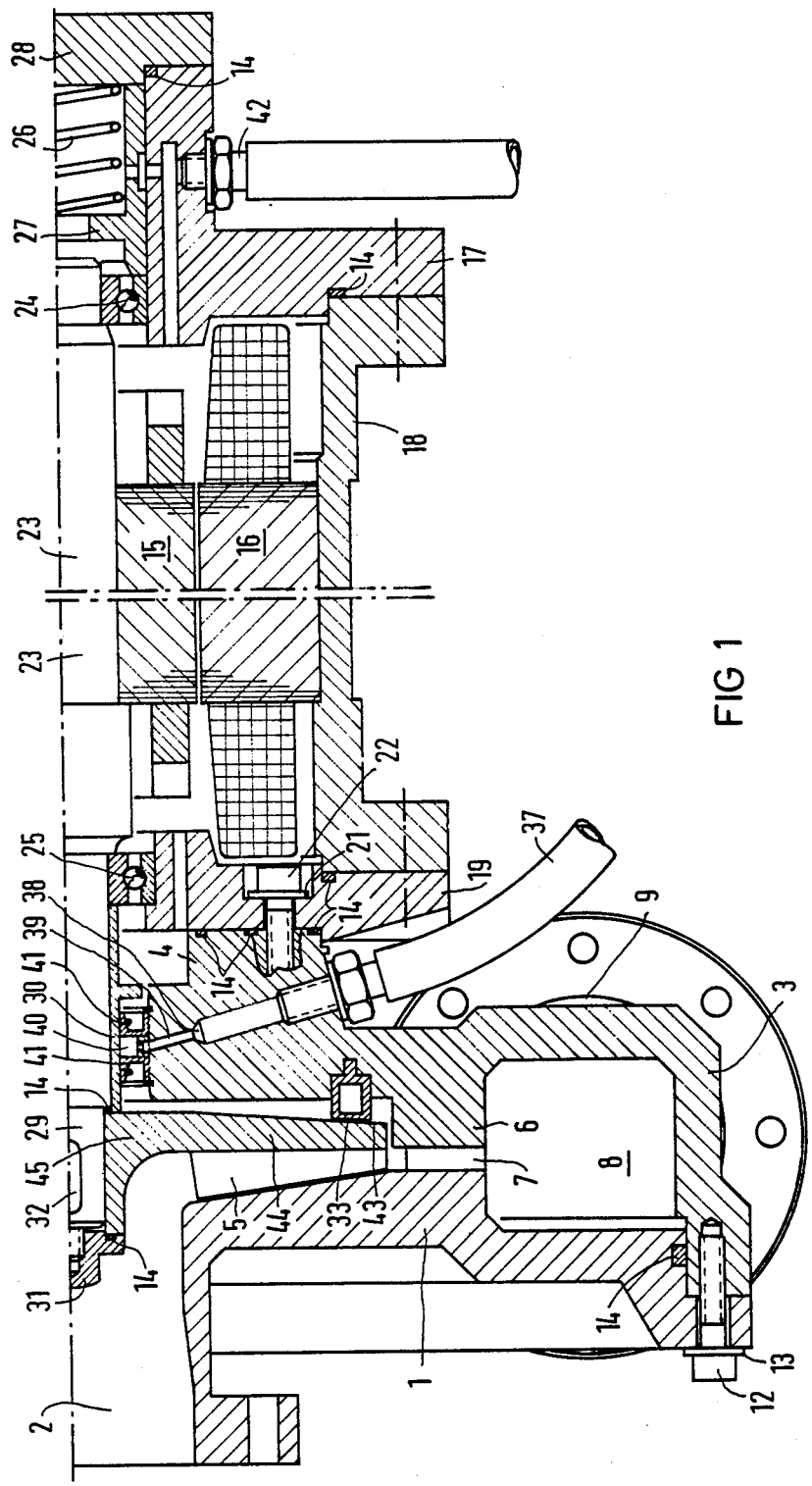
FIG. 1 is a median, longitudinal-sectional view of an assembly of a blower and an electric motor on a reduced scale.
Figure 2:
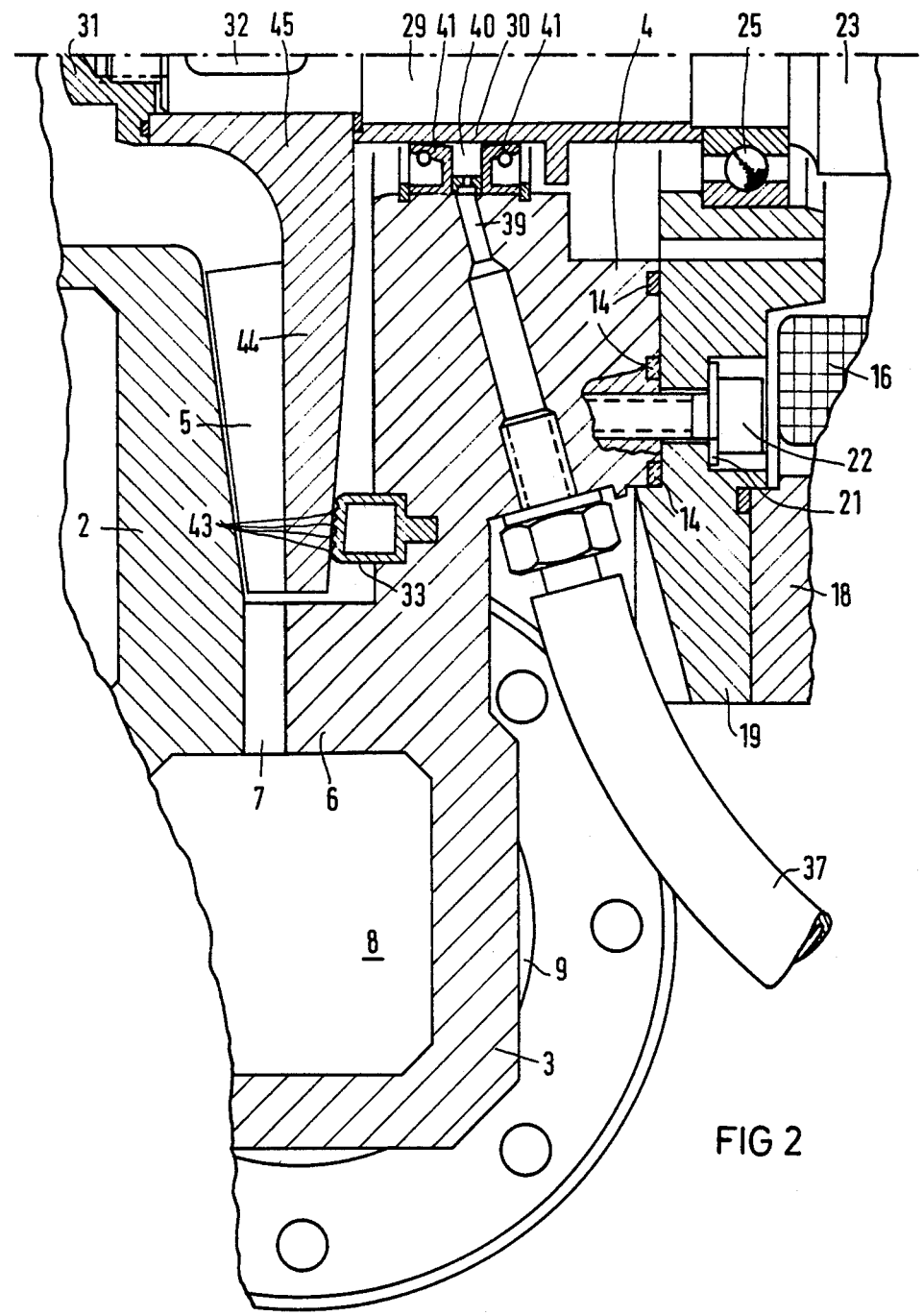
FIG. 2 is a fragmentary view of the longitudinal section of FIG. 1, in the region of a seal between the blower and the electric motor; as seen in its actual size and at rest.
Figure 3:
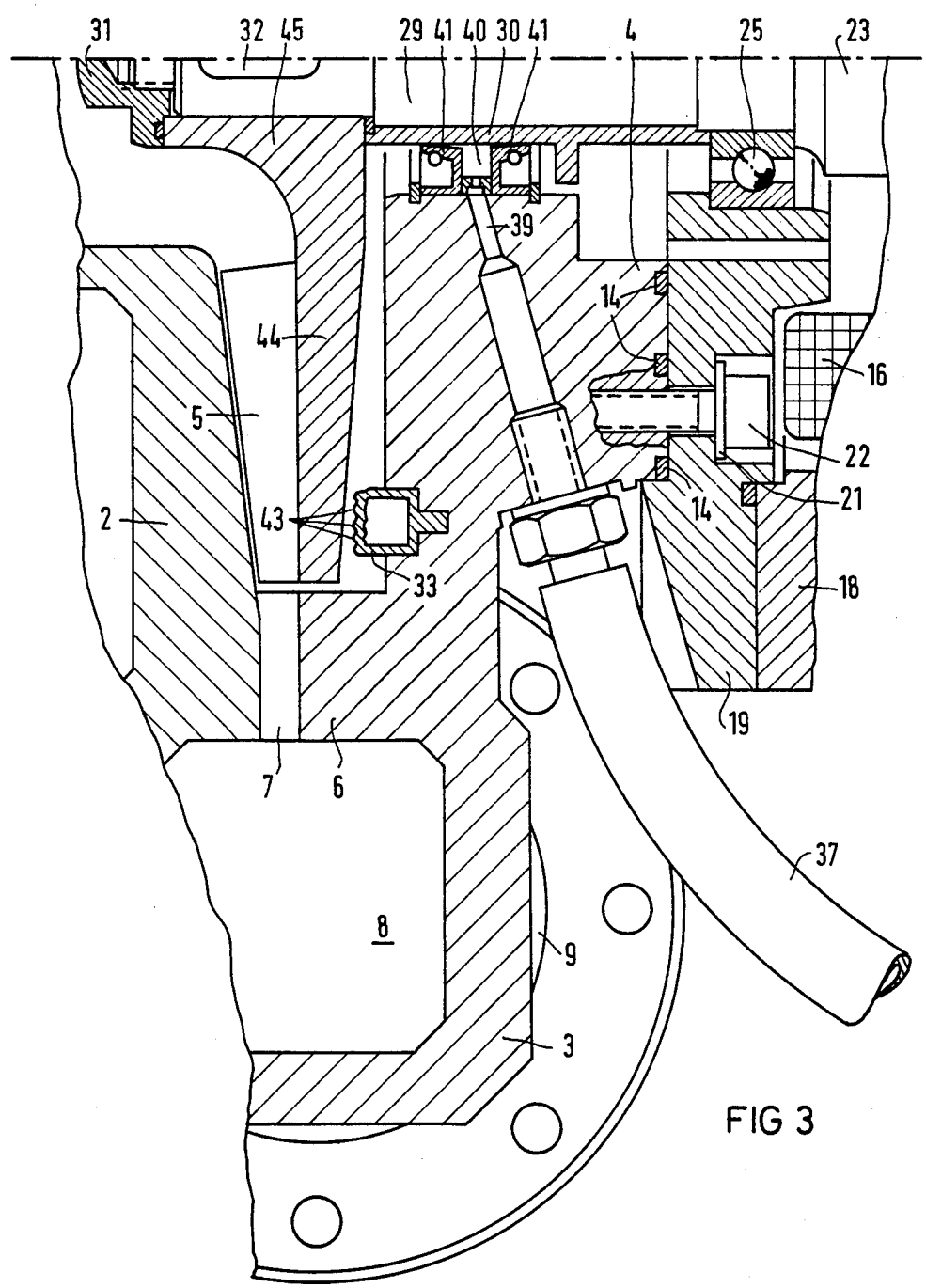
FIG. 3 is a view of the device shown in FIG. 2, as seen in the operating position.

Referring now to the figures of the drawings in detail and first, particularly, to FIG. 1 thereof, it is seen that a blower with a blower wheel or impeller blade 5 drives a gas mixture through a circulating system which is not further illustrated, wherein the gas mixture is formed of a noble gas such as neon which serves as a carrier gas and a mixture of a halogen and another noble gas which is added as a doping gas. Besides the blower, the circulatory system essentially includes an excimer laser, a gas cooler and a gas filter. A pressure of about 5 bar is maintained in the system. The pressure increase generated by the blower is about 0.25 bar, and the vacuum which is transported is about 70 l/min. The circulation of the gas mixture ensures that fresh gas mixture is available in the excimer laser at each exciting pulse.

The blower is constructed in the form of a radial blower as shown, with a blower housing formed of a shell 1 with an inlet opening 2 and a shell 3 with a connection pipe or stub 4. The shells 1 and 3 of the blower housing enclose the blower wheel 5, as well as a ring or crown 6 having guide vanes 7 which surround the the periphery of the blower housing. The ring 6 itself is enclosed by a ring channel 8, which leads to an outlet opening 9.

The ring 6 which carries the guide vanes 7 is part of the shell 3 and is covered by the shell 1. The shells 1 and 3 are held together by screws 12 and washers 13 and the separating gap between the two shells 1 and 3 is closed by a sealing ring 14.

An electric motor with a rotor 15 and a stator 16 has a vacuum-tight motor housing, formed of a flange 17, a casing or shell 18, and a flange 19 which is screwed to the connection pipe 4.

Separating gaps between the parts of the motor housing are sealed from the outside by the sealing rings 14. The flange 19 is screwed to the connection pipe 4 with washers 21 and screws 22. All of the surfaces within the motor housing are coated with a synthetic resin which does not emit gas.

The rotor 15 sits securely on a shaft 23, which is supported on roller bearings 24 and 25 that are disposed in the flanges 17 and 19. The bearings 24 and 25 are encapsulated against the outside, so that the escape of lubricant is reliably prevented. Due to the high nominal or rated speed which is sometimes required, such as 10,000 rpm, and also in order to guarantee the required purity of the gas, compressed gas bearings may be provided instead of the roller bearings 24 and 25. In such a case, the bearing surfaces of the shaft 23 float on a film of compressed gas, and it is advantageous to use the same gas which serves as the carrier gas in the gas mixture, as the compressed gas.

Regardless of the type of bearing used, a fixed bearing is used at the position of the bearing 25 and a bearing is used at the position of the bearing 24 which can slide in the axial direction, so that changes in length of the shaft 23 caused by thermal expansion, for example, can be compensated by a piston 27 which is loaded by the force of a compression spring 26. The piston 27 therefore lies centrally in the flange 17 and is held together with the spring 26 in the axial direction by an end cap 28.

The end of the shaft 23 which passes through the bearing 25 (fixed bearing) is in the form of a shaft extension or journal 29 which carries the blower wheel or impeller 5. A hub 45 of the impeller 5 is clamped in the axial direction between a sleeve 30 which bears against the bearing 25 and a screw cap 31 and the hub 45 is secured against rotation on the shaft extension 29 by a spring 32.

A hollow sealing ring 33 made of a soft material, such as rubber, is anchored in the shell 3 at the inner surface of the shell 3 of the blower housing. The sealing ring 33 can be evacuated or filled with compressed gas through a non-illustrated channel. A connection line 37 is connected to a ring channel 38 in the connection pipe 4. The ring channel 38 is connected with a ring space 40 between two radial shaft seals 41 by means of radial channels 39. Before the blower is set in operation for the first time, the blower housing is evacuated by a non-illustrated connecting pipe or stub and the motor housing is evacuated by a connecting pipe or stub 42 and they are subsequently filled with the carrier gas until the operating pressure is reached. Meanwhile, or immediately thereafter, the hollow sealing ring 33 is filed with compressed gas, preferably the carrier gas, so that sealing lips 43 thereof lie against the motor side flange of the impeller 5.

When starting the operation, the ring space 40 is first connected through the radial channels 39, the ring channel 38 and the connection line 37 to the carrier gas supply, which maintains a pressure in the ring space 40, which is always slightly greater than the pressure in the blower housing adjacent the shaft seal 41. The hollow space of the sealing ring 33 is then evacuated, at least partially, and a voltage is applied to the electric motor. The supply of carrier gas into the ring space 40 therefore assures that no gas exchange can take place between the motor housing and the blower housing. Thus, doping gas from the blower cannot enter into the motor housing, nor can possible contaminations of the contents of the motor housing reach the blower housing.

After the blower is stopped, the gas supply into the ring space 40 is maintained, at least until the sealing ring 33 is again filled with compressed gas, and the sealing lips 43 lie tightly against the flange 44.

In order to equalize unavoidable volume changes of the gas filling in the motor housing, the motor housing is connected to the blower housing by a non-illustrated pressure equalizing line, so that the gas pressure in the motor housing is determined by the position of the discharge end of the pressure equalizing line in the blower housing. It is practical to place the pressure equalizing line through an intermediate storage device in which the two gas volumes are separated from each other by a membrane.

Another possibility for equalizing the unavoidable volume changes in the motor housing is to control the absolute pressure in the motor housing and/or the pressure difference between the interior of the motor housing and the blower housing by some non-illustrated type of measuring and a control valve which is regulated by the measured value. When the maximum permissible operating pressure is reached, or exceeded, a blow-off valve is opened and gas is discharged from the motor housing until the pressure therein is sufficiently lowered. The discharge remains closed if the pressure in the motor housing is normal or too low. If the pressure falls below the nominal value due to the increasing pressure difference between the motor housing on one hand and the ring space 40 and the blower housing on the other hand, pure carrier gas flows from the ring space 40 into the motor housing through the unavoidable gap between the ring space and the shaft extension 29.

If compressed gas bearings which are supplied with compressed gas from the outside or from the motor housing are provided instead of the roller bearings 24 and 25, it is advantageous to compensate unavoidable volume changes of the gas filling of the motor housing in conjunction with a return feed of the used compressed gas.

The foregoing is a description corresponding in substance to German Application P No. 35 34 903.4, dated Sept. 30, 1985, the International priority of which is being claimed for the instant application, and which is hereby made part of this application. Any material discrepancies between the foregoing specification and the aforementioned corresponding German application are to be resolved in favor of the latter.

We claim:

1. Apparatus for propelling a continuous gas mixture stream of an inert carrier gas and an aggressive doping gas, comprising an electric motor having a motor housing filled with pure carrier gas and a shaft with a shaft extension, a radial blower having an impeller mounted directly on said shaft extension and a blower housing filled with the gas mixture and coupled to said motor housing, said impeller having a flange facing said motor and said blower housing having a wall facing said motor having an inner surface, a ring space, a hollow sealing ring inflated with compressed gas for sealing said blower housing from said motor housing when said blower is stopped, said hollow sealing ring being formed of soft material anchored at said inner surface of said wall of said blower housing, and said hollow sealing ring having a plurality of sealing lips lying against said flange of said impeller in the inflated state, and means for continuously feeding and maintaining a gas ring of pure carrier gas in said ring space for sealing said blower housing against said motor housing in an operating state.

2. Apparatus according to claim 1, wherein said ring space including said gas ring of pure carrier gas is disposed radially between said shaft extension carrying said impeller and said blower housing, and including two radially operating mechanical shaft seals axially adjacent said ring space.

3. Apparatus according to claim 1, wherein said motor housing has surfaces therein, and including a non-gassing coating of a synthetic resin covering all of said surfaces.

4. Apparatus according to claim 1, wherein the carrier gas is a pure noble gas, and the doping gas is a halogen.

5. Apparatus according to claim 1, wherein the carrier gas is a pure noble gas from the group consisting of neon, xenon and Krypton, and the doping gas is a halogen from the group consisting of chlorine and fluorine.

6. Apparatus according to claim 1, wherein said blower housing and said motor housing having an operating pressure of 5 bar, and said blower has suction and pressure sides with a pressure difference therebetween of substantially 0.25 bar at a conveying capacity of 70 l/s and a nominal speed of 11000 rpm.

* * * * *